US011493925B2

(12) United States Patent
Moore

(10) Patent No.: US 11,493,925 B2
(45) Date of Patent: Nov. 8, 2022

(54) ROBOT OBSTACLE COLLISION PREDICTION AND AVOIDANCE

(71) Applicant: Locus Robotics Corp., Wilmington, MA (US)

(72) Inventor: Thomas Moore, Edinburgh (GB)

(73) Assignee: Locus Robotics Corp., Wilmington, MA (US)

( * ) Notice: Subject to any disclaimer, the term of this patent is extended or adjusted under 35 U.S.C. 154(b) by 338 days.

(21) Appl. No.: 16/809,810

(22) Filed: Mar. 5, 2020

(65) Prior Publication Data

US 2021/0278850 A1 Sep. 9, 2021

(51) Int. Cl.
*G01S 17/931* (2020.01)
*B60R 21/013* (2006.01)
*G01S 17/89* (2020.01)
*G05D 1/02* (2020.01)

(52) U.S. Cl.
CPC ......... *G05D 1/0214* (2013.01); *B60R 21/013* (2013.01); *G01S 17/89* (2013.01); *G01S 17/931* (2020.01); *G05D 2201/0216* (2013.01)

(58) Field of Classification Search
CPC .. G05D 1/0214; G05D 1/0212; B60R 21/013; G01S 17/89; G01S 17/931; G01S 17/93; G01C 21/206
See application file for complete search history.

(56) References Cited

U.S. PATENT DOCUMENTS

| | | | |
|---|---|---|---|
| 9,896,094 B2 * | 2/2018 | Nishimura | B60W 30/0956 |
| 2008/0009966 A1 | 1/2008 | Bruemmer et al. | |
| 2010/0235033 A1 | 9/2010 | Yamamoto et al. | |
| 2018/0059682 A1 | 3/2018 | Thode | |
| 2018/0149753 A1 * | 5/2018 | Shin | G01S 7/4811 |
| 2019/0196480 A1 * | 6/2019 | Taylor | G05D 1/0088 |
| 2019/0337154 A1 * | 11/2019 | Holson | B25J 9/1697 |
| 2021/0132615 A1 * | 5/2021 | Passot | G05D 1/0274 |

OTHER PUBLICATIONS

International Searching Authority/European Patent Office, International Search Report and Written Opinion of the International Searching Authority, Application No. PCT/US2021/020790, dated May 21, 2021, 14 pages.
Rongxin Jiang et al., "A robot collision avoidance scheme based on the moving obstacle motion prediction," International Colloquium on Computing, Communication, Control, and Management, IEEE, Aug. 3, 2008, pp. 341-345, XP031314189, ISBN: 978-0-7695-3290-5.

\* cited by examiner

*Primary Examiner* — Vivek D Koppikar
*Assistant Examiner* — Kathleen B Ward
(74) *Attorney, Agent, or Firm* — Sunstein LLP

(57) ABSTRACT

A method for predicting a collision between a mobile robot and an obstacle in an environment includes obtaining laser scan data for the mobile robot at a current location in the environment. The method also includes predicting a future location of the mobile robot in the environment and producing predicted laser scan data corresponding to the future location of the mobile robot in the environment. The method further includes assessing the predicted laser scan data relative to the mobile robot at the current location to determine whether a collision with an obstacle is predicted.

18 Claims, 20 Drawing Sheets

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| | Location | Fiducial ID | |
|---|---|---|---|
| 400 | | | ← 404 |
| 402a | L01001A | 11 | |
| 402b | L01001B | 11 | |
| 402c | L01001C | 11 | |
| 402d | L01001D | 11 | |
| 402e | L01001E | 11 | |
| 402f | L01001F | 11 | |
| | L01002A | 12 | |
| | L01002B | 12 | |
| | L01002C | 12 | |
| | L01002D | 12 | |
| | L01002E | 12 | |
| | L01003A | 13 | |
| | L01003B | 13 | |
| | L01003C | 13 | |
| | L01003D | 13 | |
| | L01003E | 13 | |
| | L01003F | 13 | |
| | L01004A | 14 | |
| | L01004B | 14 | |
| | L01004C | 14 | |
| | L01004D | 14 | |
| | L01004E | 14 | |
| | L01005A | 15 | |
| | L01005B | 15 | |
| | L01005C | 15 | |
| | L01005D | 15 | |
| | L01005E | 15 | |
| | L01005F | 15 | |

FIG. 7

ROBOT OBSTACLE COLLISION PREDICTION AND AVOIDANCE

FIELD OF THE INVENTION

This invention relates to autonomous mobile robot navigation in an environment and more particularly to autonomous mobile robot obstacle collision prediction and avoidance.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

While using mobile robots and people in a busy warehouse environment increases efficiency it also increases the likelihood of robots colliding with obstacles, such as walls, shelving, people, other robots, among other things. In order for the robots to avoid obstacles they must perceive the obstacles with one or more sensors, such as a laser scanner, and then mark their observations map or grid. From there, the robots generate a plan and execute control trajectories to avoid the obstacles. Problematically, capturing and processing such a large amount of data, while the robot is navigating the environment, may result in a control cycle time for the mobile robot which is not quick enough to generate a control trajectory to avoid the obstacle.

Therefore, a need exists for an improved obstacle prediction and avoidance system and method to increase safety and reduce potential damage to robots and other objects within the environment.

BRIEF SUMMARY OF THE INVENTION

An object of this invention is to provide an obstacle prediction and avoidance system to increase safety and reduce potential damage to robots.

In one aspect, the invention includes a method for predicting a collision between a mobile robot and an obstacle in an environment includes obtaining laser scan data for the mobile robot at a current location in the environment and predicting a future location of the mobile robot in the environment. The method also includes producing predicted laser scan data corresponding to the future location of the mobile robot in the environment and assessing the predicted laser scan data relative to the mobile robot at the current location to determine whether a collision with an obstacle is predicted.

In other aspects of the invention one or more of the following features may be included. The laser scan data for the mobile robot at a current location may include raw data output from a laser scanner on the mobile robot. The raw data output from the laser scanner for the mobile robot at the current location may include laser scan points indicating points of reflection off of obstacles in the environment. The step of predicting the future location of the mobile robot in the environment may include estimating the future location of the mobile robot moving along an arc path after N seconds of travel from the current location using a commanded velocity of the mobile robot. N may be a number between 1 and 2. The predicted laser scan data may include predicted laser scan points indicating predicted points of reflection off of obstacles in the environment from the future location of the mobile robot. The method may further include representing the mobile robot as a polygon. The polygon representing the mobile robot may be an R-sided, convex polygon. The step of assessing the predicted laser scan data relative to the mobile robot at the current location may include connecting each of the laser scan points with a corresponding predicted laser scan point with an arc, thereby forming a plurality of arcs. Each arc of the plurality of arcs may comprise a plurality of line segments, L. The step of assessing the predicted laser scan data relative to the mobile robot at the current location may include determining if any of the plurality of arcs intersect with a point on the polygon representing the mobile robot, which is indicative of a potential collision between the mobile robot and an obstacle. The method may further include adjusting the commanded velocity of the mobile robot using a scaling factor based at least in part on a depth of incursion into the polygon for at least one intersecting arc. The depth of incursion into the polygon for each intersecting arc may be determined based on the length of an arc length approximation for the intersecting arc. For each intersecting arc, a ratio of a straight line distance from the current laser scan point on the obstacle to the point of intersection on the polygon relative to the arc length approximation may be determined and the minimum ratio is used as the scaling factor.

In other aspects, the invention includes an autonomous mobile robot configured to predict a collision with an obstacle in an environment. The robot includes a mobile robot base and a laser scanner mounted on the mobile robot base. There is a computer on the mobile robot base, including a processor and a memory. The computer is operatively coupled to the laser scanner and the processor is configured to execute instructions stored in memory to obtain laser scan data for the mobile robot at a current location in the environment. The processor is also configured to predict a future location of the mobile robot in the environment and to produce predicted laser scan data corresponding to the future location of the mobile robot in the environment. The processor is further configured to assess the predicted laser scan data relative to the mobile robot at the current location to determine whether a collision with an obstacle is predicted.

In further aspects of the invention one or more of the following features may be included. The laser scan data for the mobile robot at a current location may include raw data output from a laser scanner on the mobile robot. The raw data output from the laser scanner for the mobile robot at the current location may include laser scan points indicating points of reflection off of obstacles in the environment. The instruction stored in memory to predict the future location of the mobile robot in the environment may include estimating the future location of the mobile robot moving along an arc path after N seconds of travel from the current location using a commanded velocity of the mobile robot. N may be a number between 1 and 2. The predicted laser scan data may include predicted laser scan points indicating predicted points of reflection off of obstacles in the environment from the future location of the mobile robot. The processor may be further configured to execute instructions stored in memory to represent the mobile robot as a polygon. The polygon representing the mobile robot may be an R-sided, convex polygon. When the processor executes instructions stored in memory to assess the predicted laser scan data relative to the mobile robot at the current location, the processor may be further configured to connect each of the laser scan points with a corresponding predicted laser scan point with an arc, thereby forming a plurality of arcs. Each arc of the plurality of arcs may comprise a plurality of line segments, L. When the processor executes instructions stored in memory to assess the predicted laser scan data relative to the mobile robot at the current location, the processor may be further configured to determine if any of the plurality of arcs intersect with a point on the polygon representing the mobile robot, which is indicative of a potential collision between the mobile robot and an obstacle. The processor may further be configured to execute instructions stored in memory to adjust a commanded velocity of the mobile robot using a scaling factor based at least in part on a depth of incursion into the polygon for at least one intersecting arc. The depth of incursion into the polygon for each intersecting arc may be determined based on the length of an arc length approximation for the intersecting arc. The processor may further be configured to execute instructions stored in memory to calculate a ratio for each intersecting arc, wherein the ratio is of a straight line distance from the current laser scan point on the obstacle to the point of intersection on the polygon relative to the arc length approximation and the minimum ratio is used as the scaling factor.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION OF INVENTION

Figure 1:
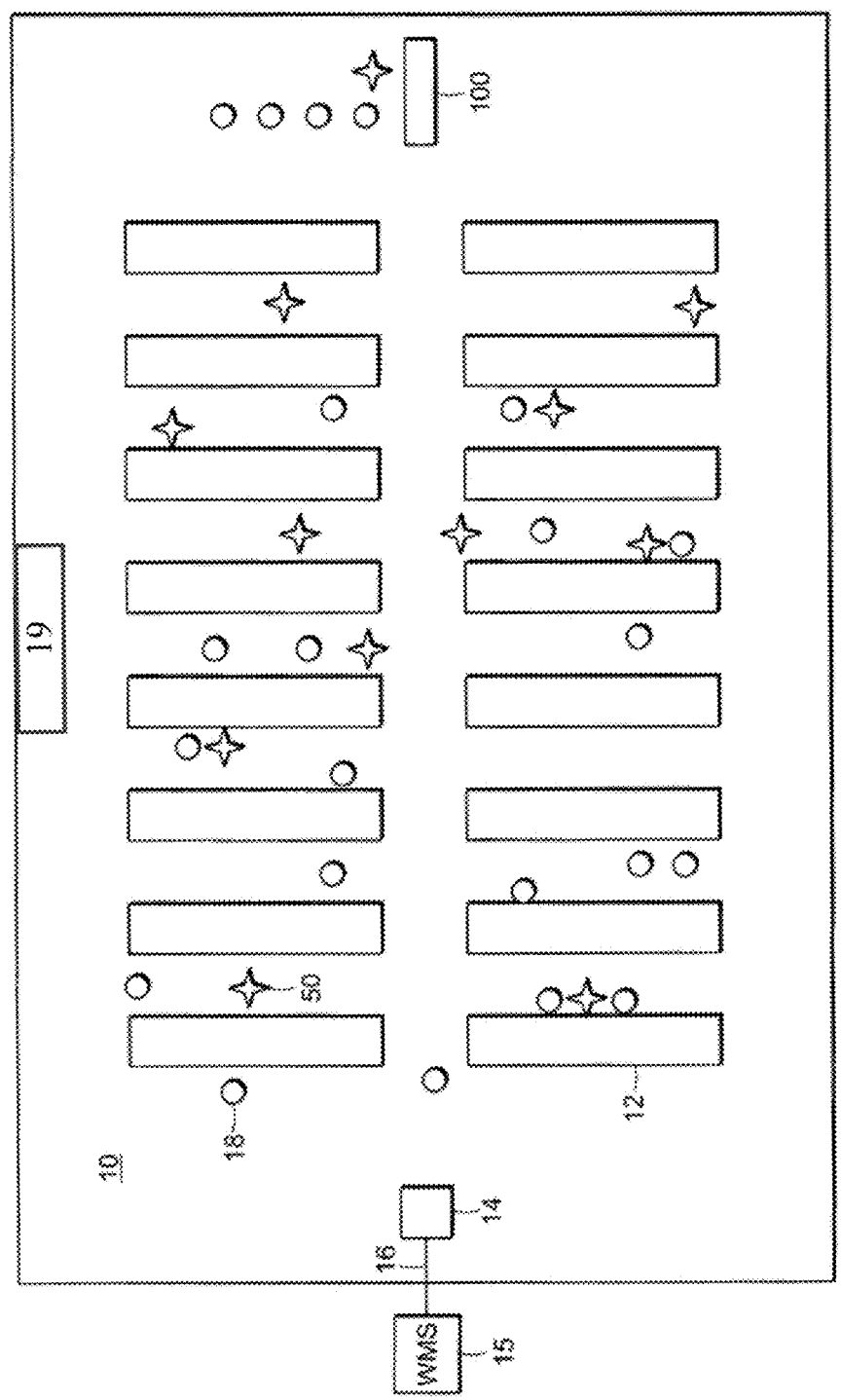
FIG. 1 is a top plan view of an order-fulfillment warehouse.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The disclosure is directed to autonomous mobile robot obstacle collision prediction and avoidance, which may be applied to any autonomous mobile robots or "AMRs" application. In order to provide some context for the invention, one application using AMRs for order fulfillment in a warehouse is described. In addition, a specific AMR implementation is described herein, but it is also only to provide context for the AMR obstacle collision prediction and avoidance according to this invention. For the avoidance of doubt, the invention described herein may be implemented in any AMR for any application.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2A:
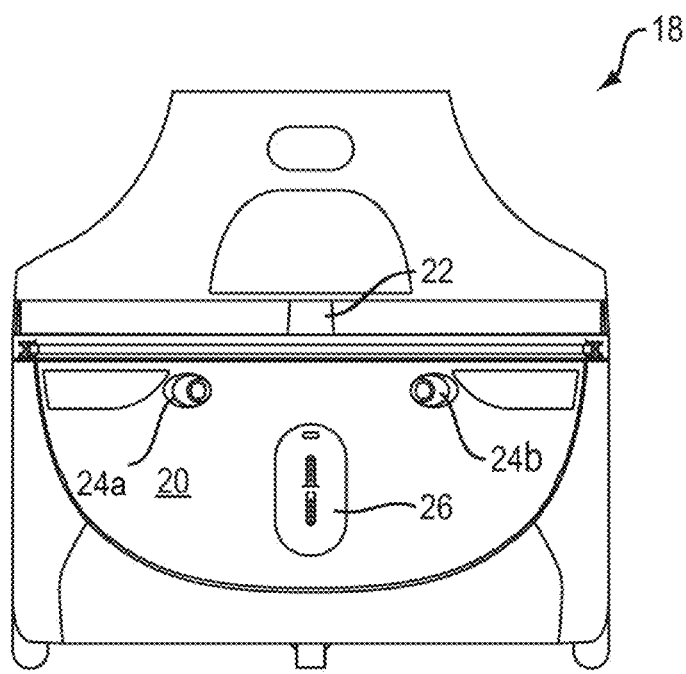
FIG. 2A is a front elevational view of a base of one of the robots used in the warehouse shown in FIG. 1.
Figure 2B:
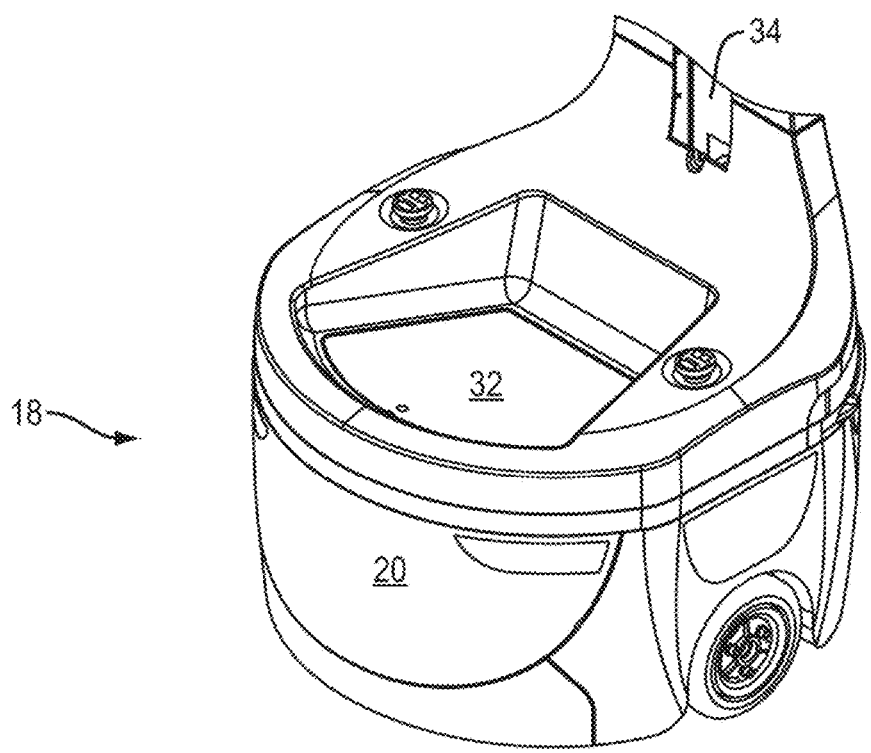
FIG. 2B is a perspective view of a base of one of the robots used in the warehouse shown in FIG. 1.
Figure 3:
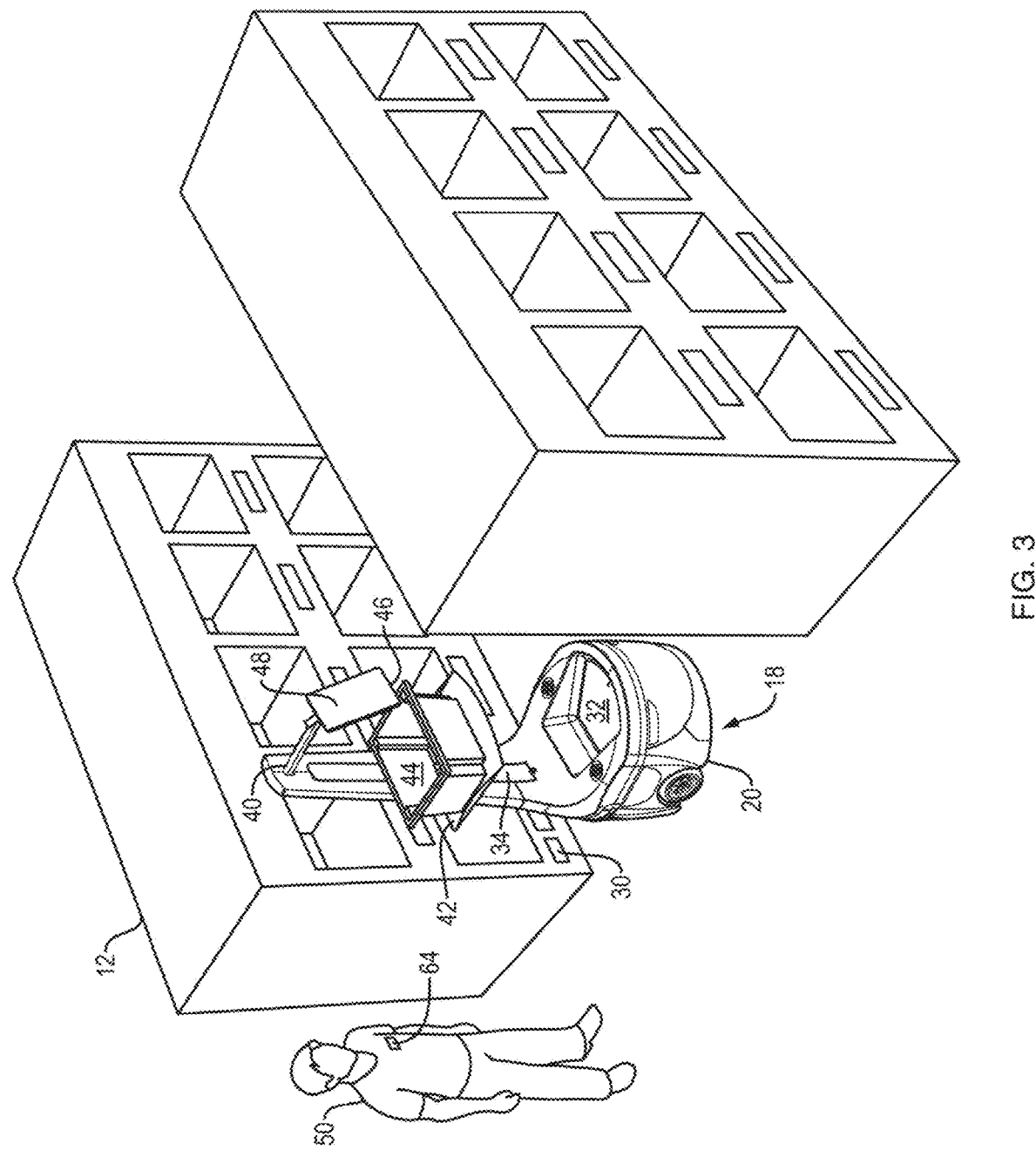
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar scanner 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
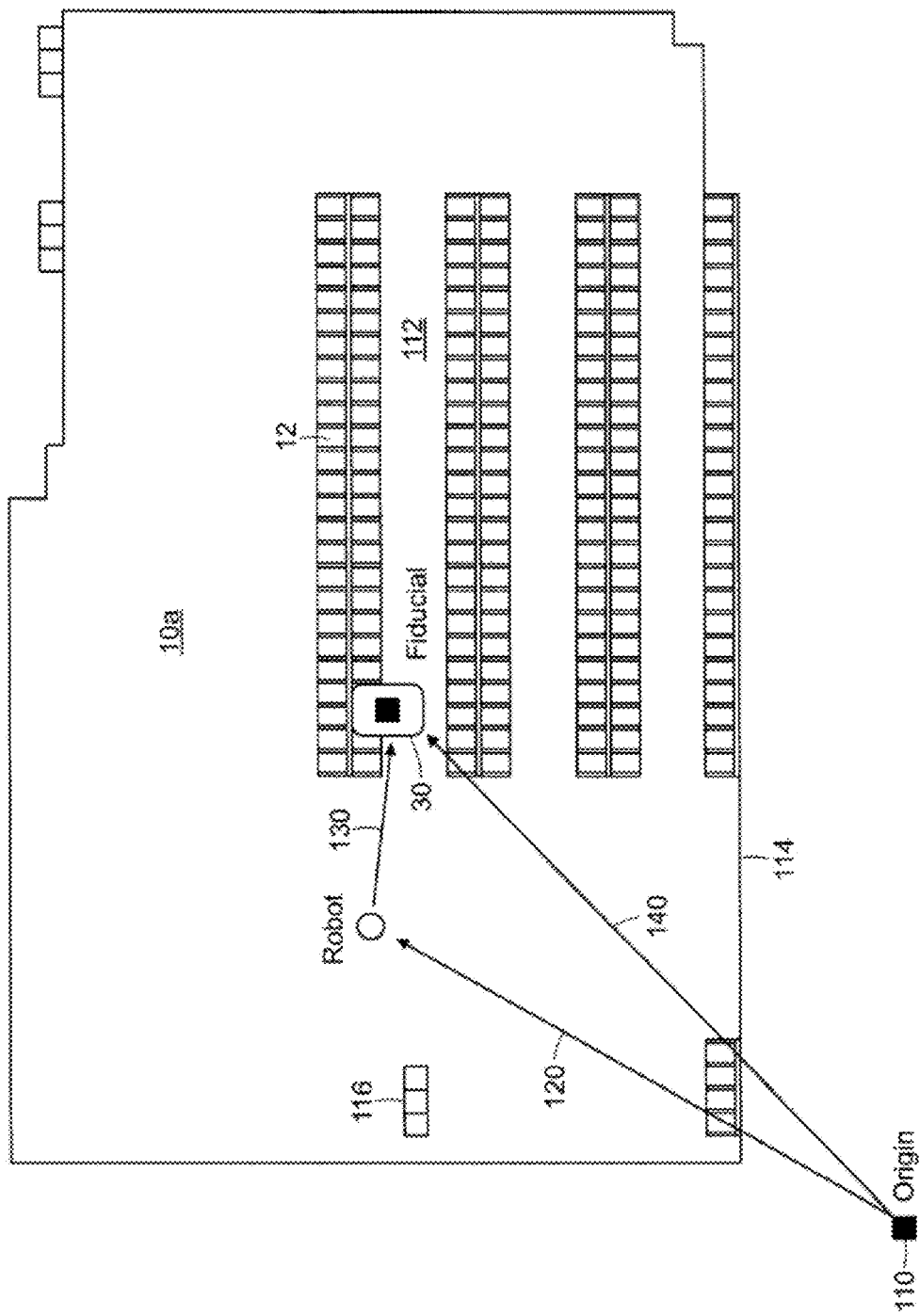
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
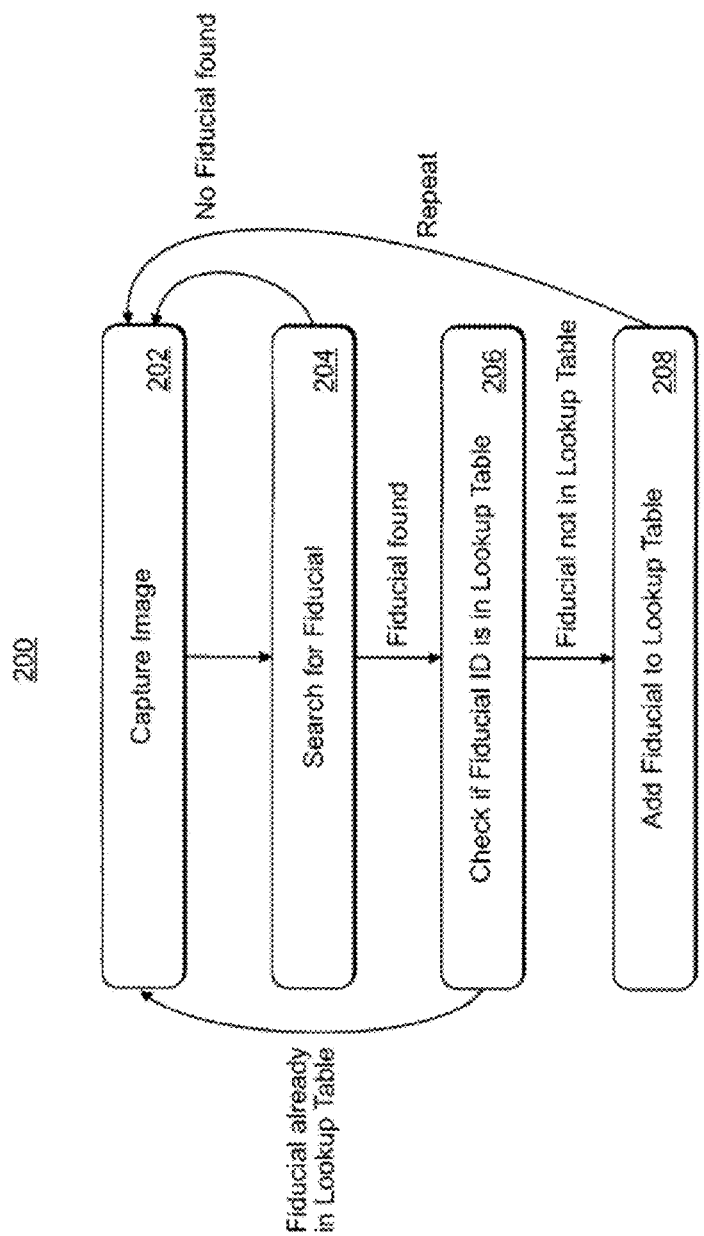
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z,ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alphanumeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial s, Robot 18 can determine the pose of the fiducial ID using the information in table 300, FIG. 6, and then navigate to the pose, as described herein.

Figure 8:
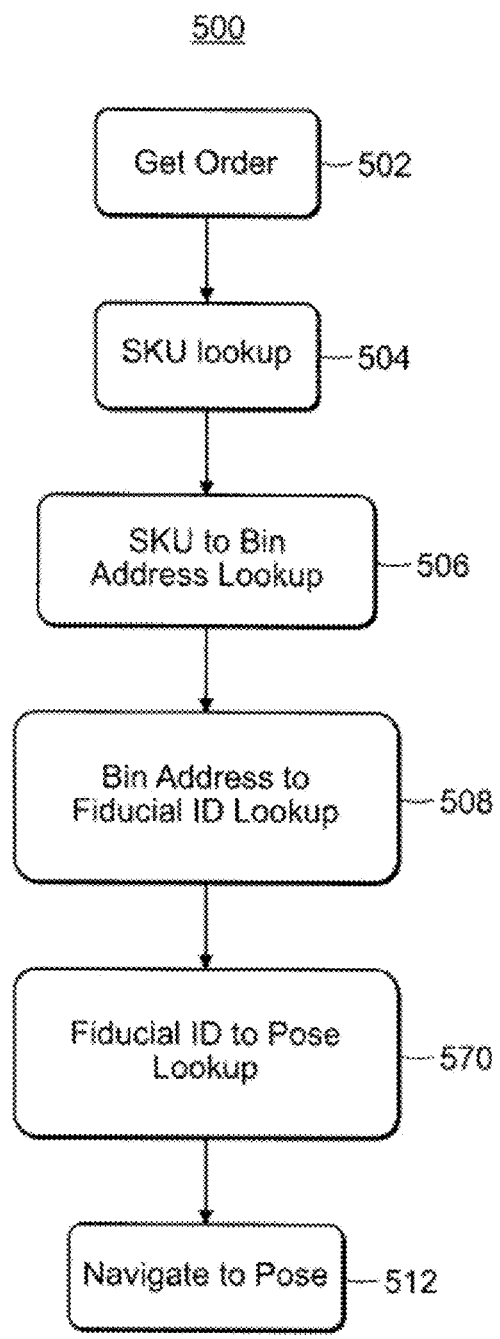
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Robot System

Figure 9:
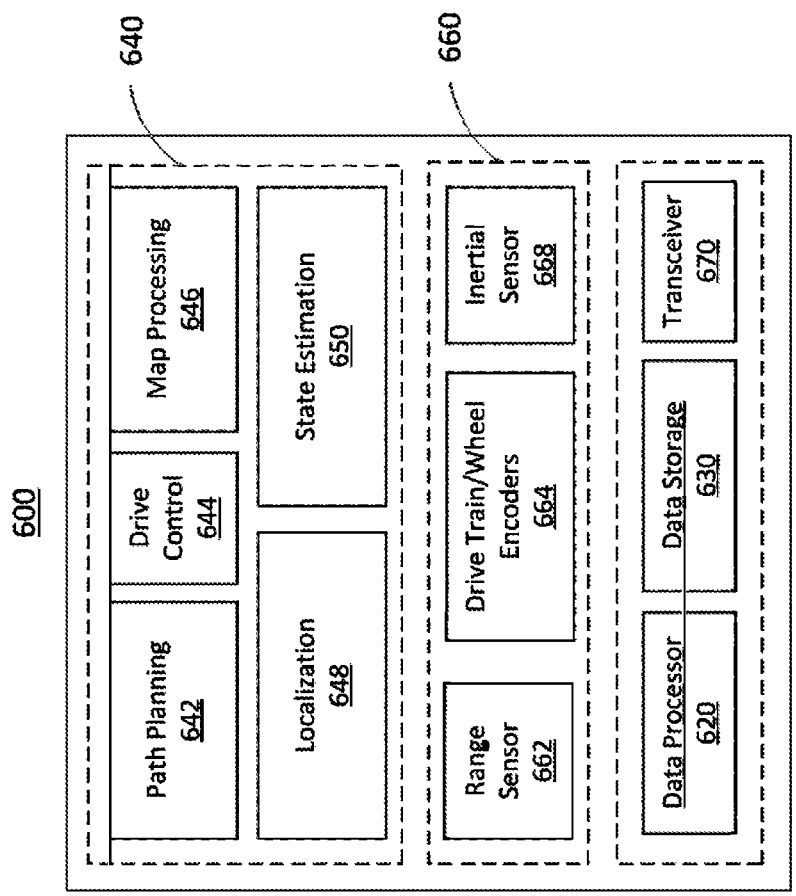
FIG. 9 shows one embodiment of a robot system for use with the methods and systems of present invention.

FIG. 9 illustrates a system view of one embodiment of robot 18 for use in the above described order fulfillment warehouse application. Robot system 600 comprises data processor 620, data storage 630, processing modules 640, and sensor support modules 660. Processing modules 640 may include path planning module 642, drive control module 644, map processing module 646, localization module 648, and state estimation module 650. Sensor support modules 660 may include range sensor module 662, drive train/wheel encoder module 664, and inertial sensor module 668.

Data processor 620, processing modules 642 and sensor support modules 660 are capable of communicating with any of the components, devices or modules herein shown or described for robot system 600. A transceiver module 670 may be included to transmit and receive data. Transceiver module 670 may transmit and receive data and information to and from a supervisor system or to and from one or other robots. Transmitting and receiving data may include map data, path data, search data, sensor data, location and orientation data, velocity data, and processing module instructions or code, robot parameter and environment settings, and other data necessary to the operation of robot system 600.

In some embodiments, range sensor module 662 may comprise one or more of a scanning laser, radar, laser range finder, range finder, ultrasonic obstacle detector, a stereo vision system, a monocular vision system, a camera, and an imaging unit. Range sensor module 662 may scan an environment around the robot to determine a location of one or more obstacles with respect to the robot. In a preferred embodiment, drive train/wheel encoders 664 comprises one or more sensors for encoding wheel position and an actuator for controlling the position of one or more wheels (e.g., ground engaging wheels). Robot system 600 may also include a ground speed sensor comprising a speedometer or radar-based sensor or a rotational velocity sensor. The rotational velocity sensor may comprise the combination of an accelerometer and an integrator. The rotational velocity sensor may provide an observed rotational velocity for the data processor 620, or any module thereof.

In some embodiments, sensor support modules 660 may provide translational data, position data, rotation data, level data, inertial data, and heading data, including historical data of instantaneous measures of velocity, translation, position, rotation, level, heading, and inertial data over time. The translational or rotational velocity may be detected with reference to one or more fixed reference points or stationary objects in the robot environment. Translational velocity may be expressed as an absolute speed in a direction or as a first derivative of robot position versus time. Rotational velocity may be expressed as a speed in angular units or as the first derivative of the angular position versus time. Translational and rotational velocity may be expressed with respect to an origin 0,0 (e.g. FIG. 1, 110) and bearing of 0-degrees relative to an absolute or relative coordinate system. Processing modules 640 may use the observed translational velocity (or position versus time measurements) combined with detected rotational velocity to estimate observed rotational velocity of the robot.

In other embodiments, modules not shown in FIG. 9 may comprise a steering system, braking system, and propulsion system. The braking system may comprise a hydraulic braking system, an electro-hydraulic braking system, an electro-mechanical braking system, an electromechanical actuator, an electrical braking system, a brake-by-wire braking system, or another braking system in communication with drive control 644. The propulsion system may comprise an electric motor, a drive motor, an alternating current motor, an induction motor, a permanent magnet motor, a direct current motor, or another suitable motor for propelling a robot.

The propulsion system may comprise a motor controller (e.g., an inverter, chopper, wave generator, a multiphase controller, variable frequency oscillator, variable current supply, or variable voltage supply) for controlling at least one of the velocity, torque, and direction of rotation of the motor shaft of the electric motor. Preferably, drive control 644 and propulsion system (not shown) is a differential drive (DD) control and propulsion system. In a DD control system robot control is non-holonomic (NH), characterized by constraints on the achievable incremental path given a desired translational and angular velocity. Drive control 644 in communication with propulsion system may actuate incremental movement of the robot by converting one or more instantaneous velocities determined by path planning module 642 or data processor 620.

One skilled in the art would recognize other systems and techniques for robot processing, data storage, sensing, control and propulsion may be employed without loss of applicability of the present invention described herein.

Maps

Figure 10:
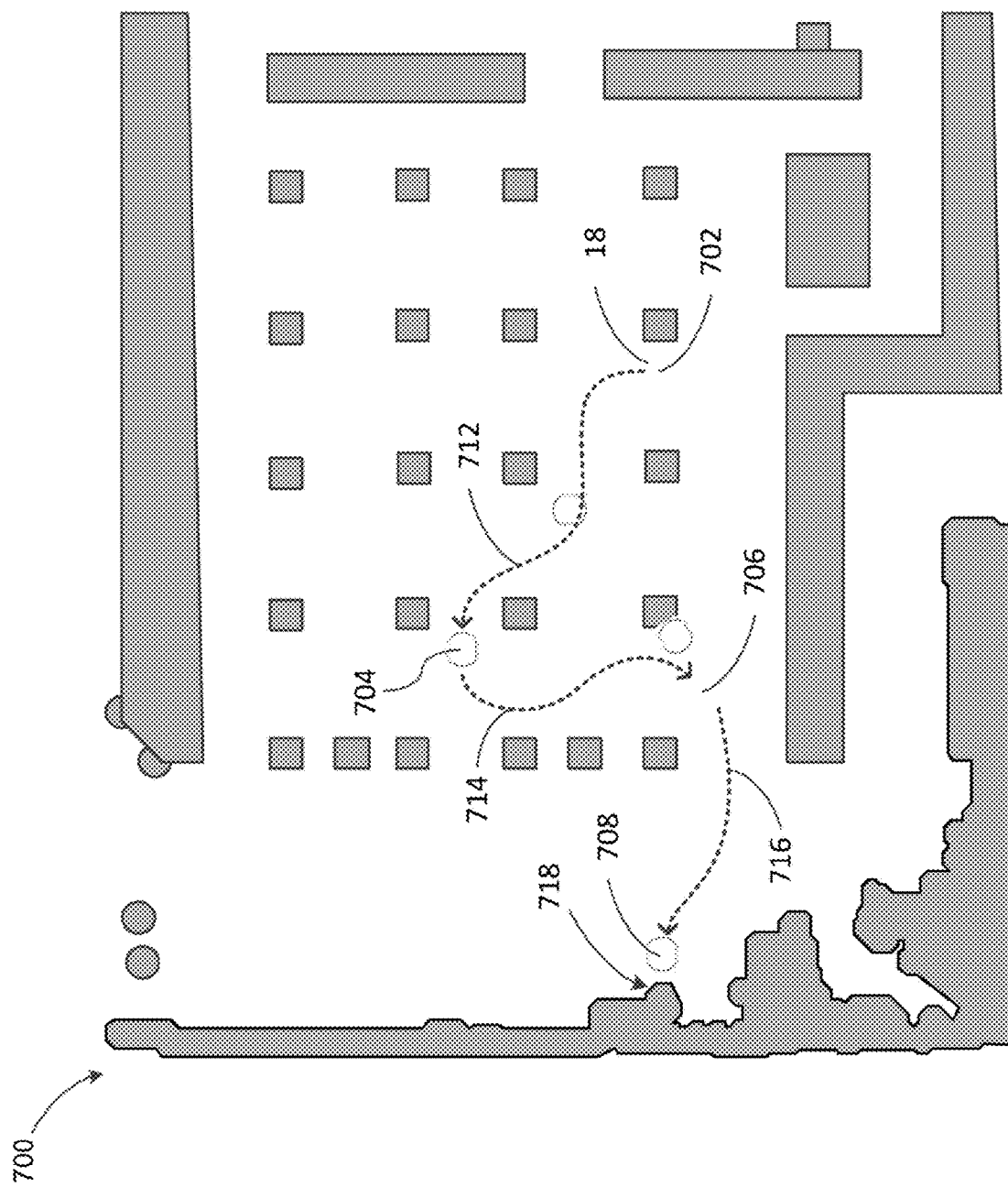
FIG. 10 depicts generalized navigation of a robot from a current location to a target location through an environment represented by a spatial map.

Navigation by an autonomous or semi-autonomous robot requires some form of spatial model of the robot's environment. Spatial models may be represented by bitmaps, object maps, landmark maps, and other forms of two- and three-dimensional digital representations. A spatial model of a warehouse facility, as shown in FIG. 10 for example, may represent a warehouse and obstacles within such as walls, ceilings, roof supports, windows and doors, shelving and storage bins. Obstacles may be stationary or moving, for example, such as other robots or machinery operating within the warehouse, or relatively fixed but changing, such as temporary partitions, pallets, shelves and bins as warehouse items are stocked, picked and replenished.

Spatial models in a warehouse facility may also represent target locations such as a shelf or bin marked with a fiducial to which a robot may be directed to pick product or to perform some other task, or to a temporary holding location or to the location of a charging station. For example, FIG. 10 depicts the navigation of robot 18 from a starting location 702 to intermediate locations 704,706 to destination or target location 708 along its path 712,714,716. Here the spatial model captures features of the environment through which the robot must navigate, including features of a structure at a destination 718 which may be a shelf or bin or a robot charger station.

Figure 11:
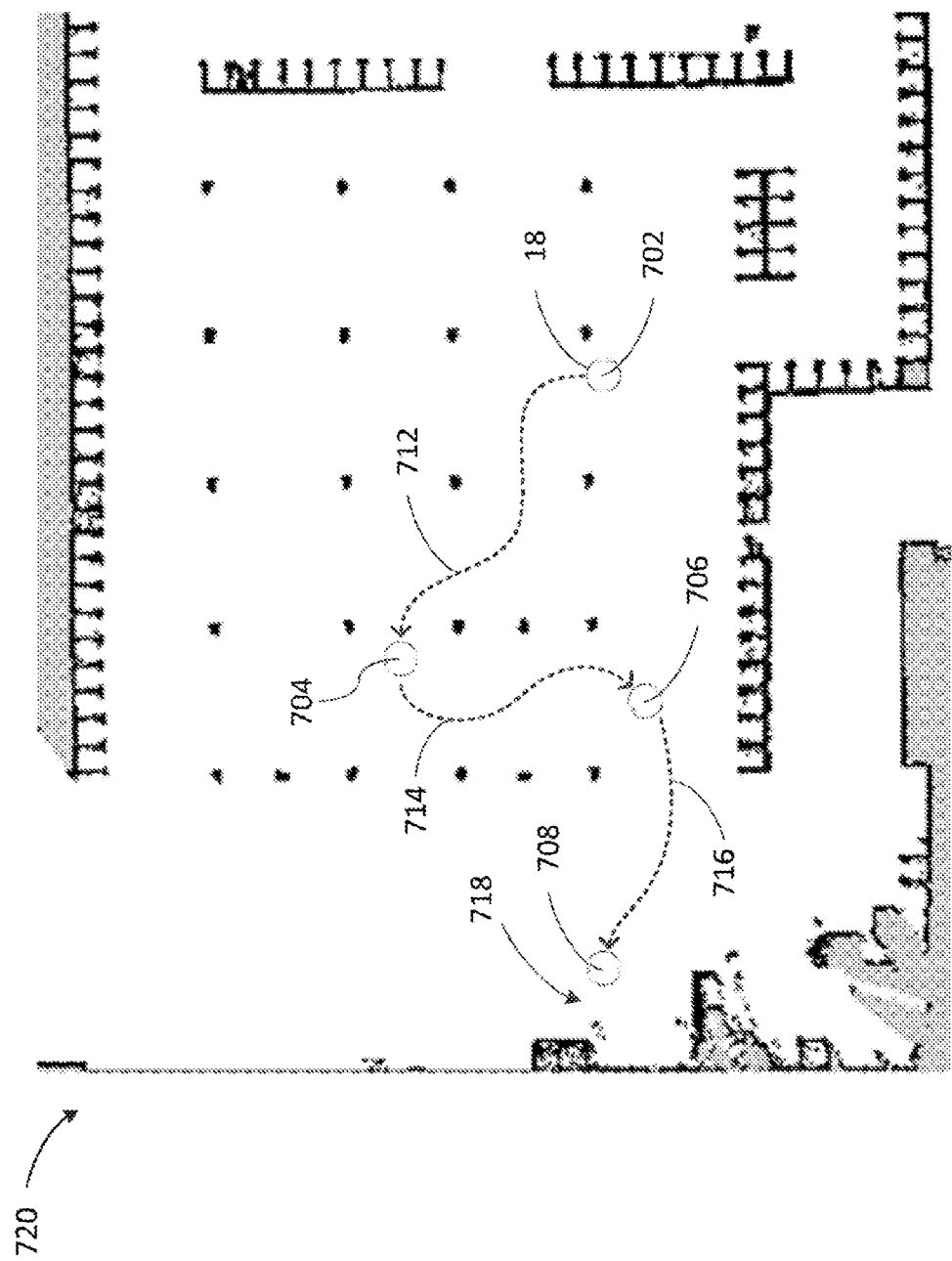
FIG. 11 depicts navigation of robot in relation to a SLAM map of the environment of FIG. 10, according to one aspect of the invention.

The spatial model most commonly used for robot navigation is a bitmap of an area or facility. FIG. 11, for example, depicts a portion of a two-dimensional map for the areas shown in the spatial model of FIG. 10. Map 720 may be represented by bitmaps having pixel values in a binary range 0,1, representing black or white, or by a range of pixel values, for example 0-255 representing a gray-scale range of black (0) to white (255) or by color ranges, the ranges of which may depict uncertainties in whether a feature is present at the location represented by the pixel values. As shown in FIG. 11, for example, pixels in black (0) represent obstacles, white (255) pixels represent free space, and areas of solid gray (some value between 0 and 255, typically 128) represent unknown areas.

The scale and granularity of map 720 shown in the FIG. 11 may be any such scale and dimensions as is suitable for the range and detail of the environment. For example, in some embodiments of the present invention, each pixel in the map may represent 5 square centimeters ($cm^2$). In other embodiments each pixel may represent a range from 1 $cm^2$ to 5 $cm^2$. However, the spatial resolution of a map for use with the present invention may be larger or smaller without loss of generality or benefit to the application of its methods.

As depicted in FIG. 11, map 720 may be used by the robot to determine its pose within the environment and to plan and control its movements along path 712,714,716, while avoiding obstacles. Such maps may be "local maps", representing spatial features in the immediate vicinity of the robot or target location, or "global maps", representing features of an area or facility encompassing the operating range of one or more robots. Maps may be provided to a robot from an external supervisory system or a robot may construct its map using onboard range finding and location sensors. One or more robots may cooperatively map a shared environment, the resulting map further enhanced as the robots navigate, collect, and share information about the environment.

In some embodiments the supervisory system may comprise a central server performing supervision of a plurality of robots in a manufacturing warehouse or other facility, or the supervisory system may comprise a distributed supervisory system consisting of one or more servers operating within or without the facility either fully remotely or partially without loss of generality in the application of the methods and systems herein described. The supervisory system may include a server or servers having at least a computer processor and a memory for executing a supervisory system and may further include one or more transceivers for communicating information to one or more robots operating in the warehouse or other facility. Supervisory systems may be hosted on computer servers or may be hosted in the cloud and communicating with the local robots via a local transceiver configured to receive and transmit messages to and from the robots and the supervisory system over wired and/or wireless communications media including over the Internet.

One skilled in the art would recognize that robotic mapping for the purposes of the present invention could be performed using methods known in the art without loss of generality. Further discussion of methods for robotic mapping can be found in Sebastian Thrun, "Robotic Mapping: A Survey", Carnegie-Mellon University, CMU-CS-02-111, February, 2002, which is incorporated herein by reference.

A robot outfitted with sensors, as described above, can use its sensors for localization as well as contribute to the building and maintenance of the map of its environment. Sensors used for map building and localization may include light detection and ranging ("LIDAR" or "laser scanning" or "laser-radar") sensors. Laser-radar scanners measure the range and distance to objects in a horizontal plane with a series of discrete, angular sweeps of the robot's local environment. A range finding sensor acquires a set of measurements, a "scan" taken at discrete angular increments of preferably one-quarter (0.25) degree increments over a 180-degree arc or a greater or lesser degree arc, or a full 360-degree arc about the robot. A laser-radar scan, for example, may be a set of measurements representing the return time and strength of a laser signal, each measurement at a discrete angular increment indicating a potential obstacle at a distance from the robot's current position.

Figure 12:
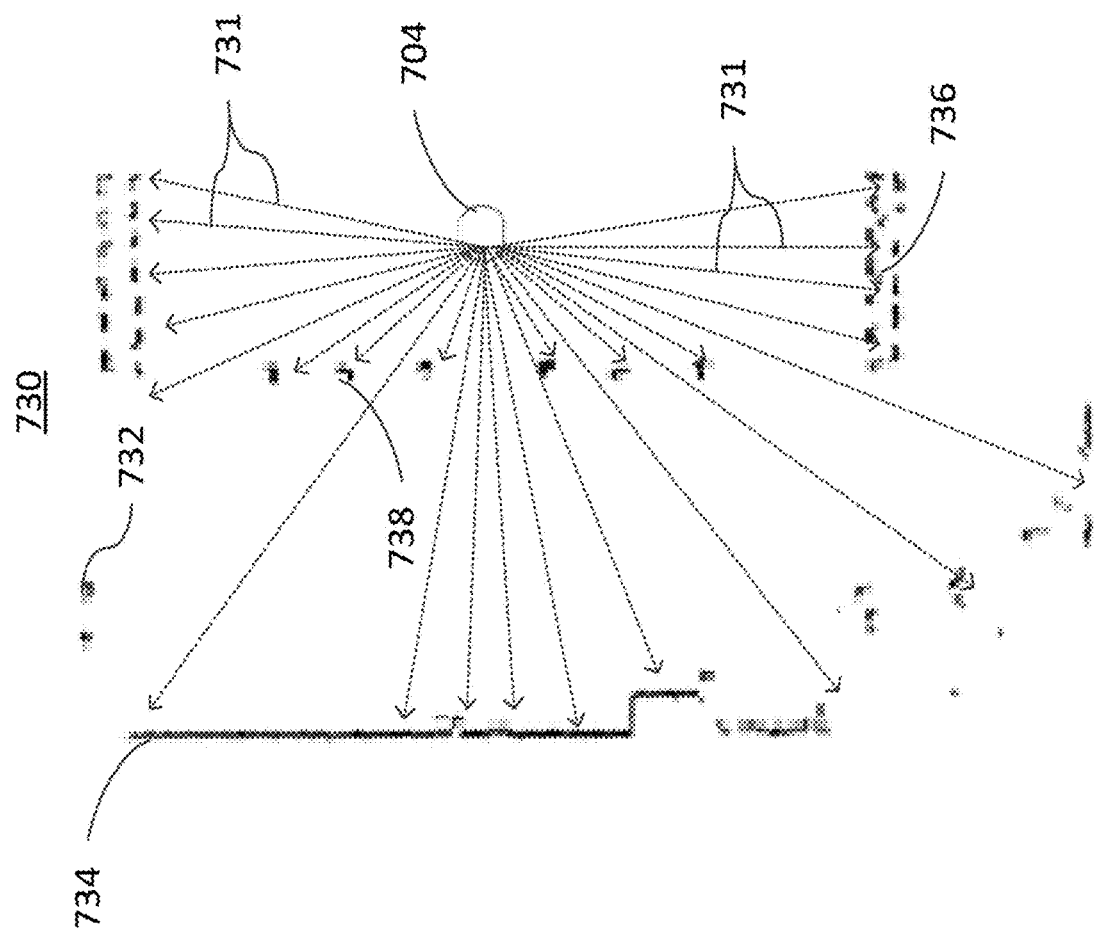
FIG. 12 depicts acquiring a range finding scan by a robot at a location within the spatial environment.

For illustration, as shown in FIG. 12, a laser-radar scan taken at location 704 can be represented graphically as a two-dimensional bitmap 730. Scan 730 as shown depicts an approximately 180-degree horizontal arc facing in the direction of travel of the robot at intermediate pose 704. Individual laser-radar measurements 731, depicted by directional broken lines, detect obstacles in the robot's environment at structures represented by pixels at 732, 734, 736, and 738 in scan 730. In some embodiments, scans of straight walls may be "filled in" in scan 730 where a connected geographic structure 734 may be known from other data or discernable by alignment of point cloud pixels.

Other forms of range finding sensors include sonar, radar, and tactile sensor without departing from the scope of the invention. Examples of commercially available range finding and location and orientation sensors suitable for use with the present invention include, but are not limited to, the Hokuyo UST-10LX, the SICK LMS 100, and the Velodyne VLP-16. A robot may have one or more range or location sensors of a particular type, or it may have sensors of different types, the combination of sensor types producing measurements that collectively map its environment. Further discussion of methods of robotic mapping by LIDAR and other scanners can be found in Edwin B. Olson, "Robust and Efficient Robotic Mapping", PhD Dissertation, Carnegie-Mellon University, 2008, which is incorporated herein by reference.

Obstacle Collision Prediction and Avoidance

In order for a mobile robot to avoid obstacles, such as walls, shelving, people, other robots, among other things, it must perceive the obstacles with its laser scanner and then mark its observations in a 2D costmap (grid). From there, the robot generates a plan and executes a control trajectory to avoid the obstacles. Problematically, capturing and processing such a large amount of data, while the robot is navigating the environment, may result in a control cycle time for the mobile robot which is not quick enough to generate a control trajectory to avoid the obstacle.

The raw laser scan data output from laser-radar scanner 22 of FIG. 2A, for example, may be generated at 40 Hz, which is far faster than the standard control cycle of the robot. This laser scan data and the commanded velocity of the robot may be used according to an aspect of this invention as a secondary means of collision detection and avoidance outside the primary sense/plan/act loop that guides robot navigation. More specifically, the robot uses the raw laser scan data, its current velocity, and the commanded velocity to make a prediction about where the robot will be after a predetermined amount of time, e.g. after N seconds, wherein Nis configurable. N may be an integer or a real valued number between, for example, 0.0 and a maximum value of a double-precision floating point number. N may have a typical value of between 1.0 and 2.0 seconds, but it ultimately depends on the maximum travel velocity of the robot. N may be adjusted dynamically as the robot velocity changes over time. Using a predicted pose, the robot may also predict what the laser scan will look like at that moment.

Figure 13:
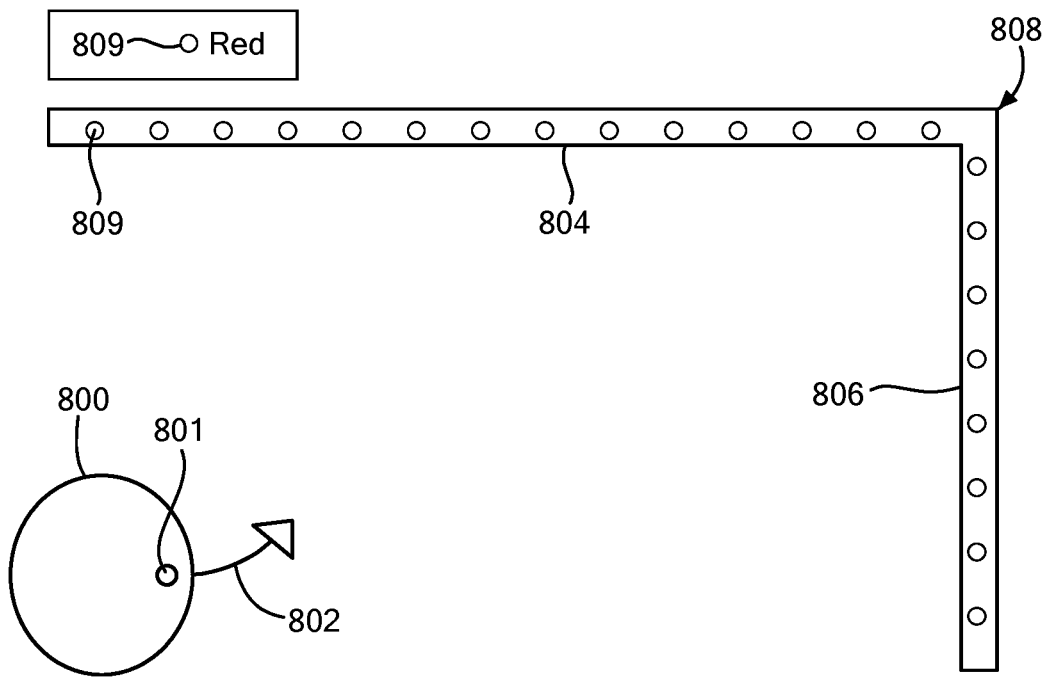
FIG. 13 depicts an image of a robot on a trajectory toward two adjoining walls with a laser scan points on the walls from the laser scanner of the robot.
Figure 14:
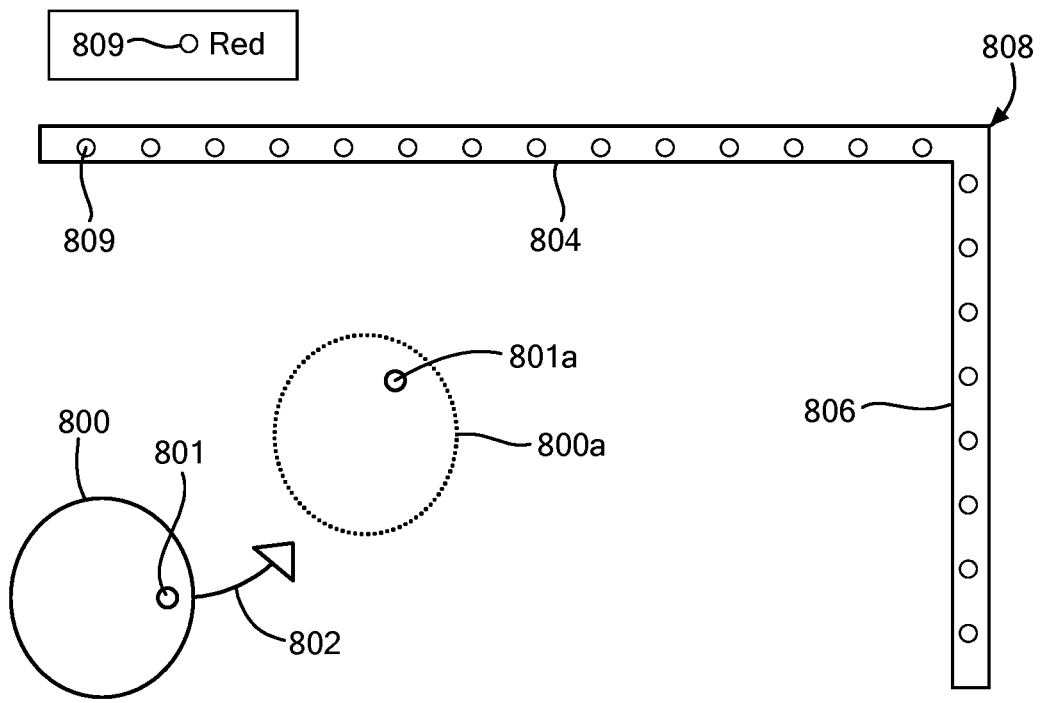
FIG. 14 depicts an image of the robot of FIG. 13 and includes a predicted position of the robot after N seconds of travel on the trajectory.
Figure 15:
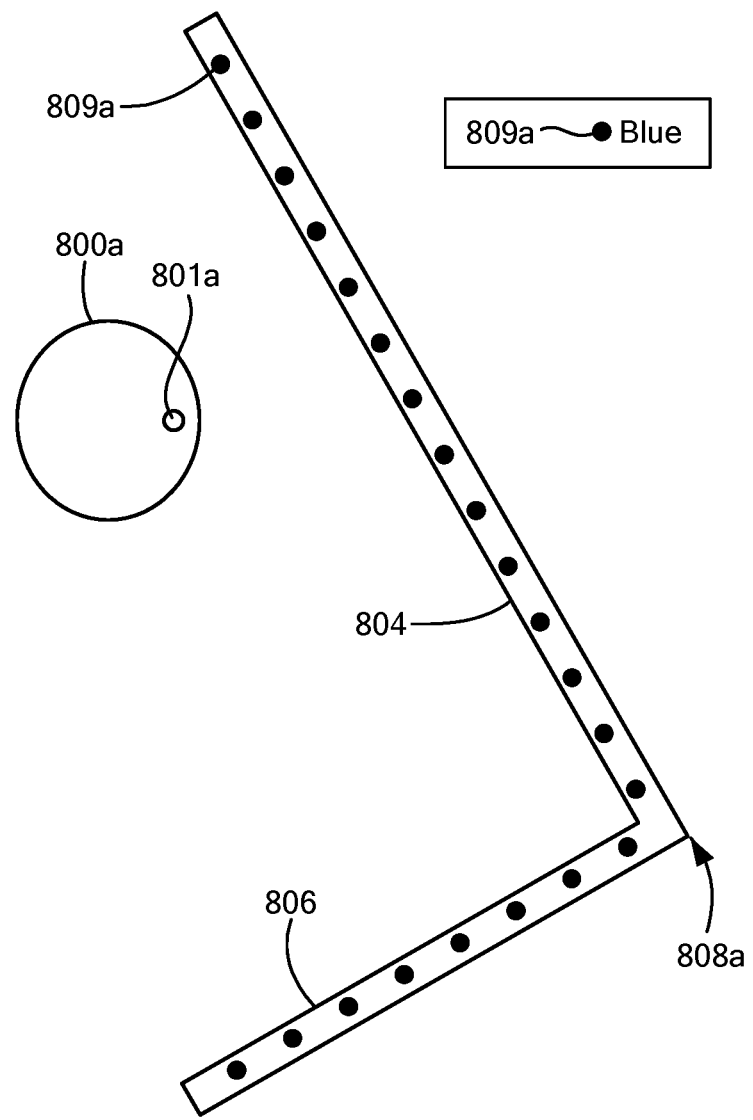
FIG. 15 depicts an image of the robot at the predicted location of FIG. 14 with predicted laser scan points on the walls from the laser scanner of the robot at the predicted location.

Referring to FIG. 13, FIG. 1 robot 800 is shown travelling along an arc path 802 towards two intersecting wall structures 804 and 806, represented by thick black lines. Dot 801 on robot 800 indicates the front of the robot. The laser scanner of robot 800 reflects off the wall structures 804 and 806, at a plurality of points producing the laser scan 808 indicated by a plurality of points in red, including e.g. laser scan point 809. In FIG. 14, the predicted position of robot 800 after N seconds, as it continues to travel along that arc path 802 at the commanded velocity, is represented by robot 800a shown in lighter shading closer to both of the wall structures 804 and 806. In FIG. 15, there is shown a representation of the laser scan 808a from the predicted position of robot 800a. In this predicted position the predicted laser scan points in blue, including e.g. laser scan point 809a are depicted.

Figure 16:
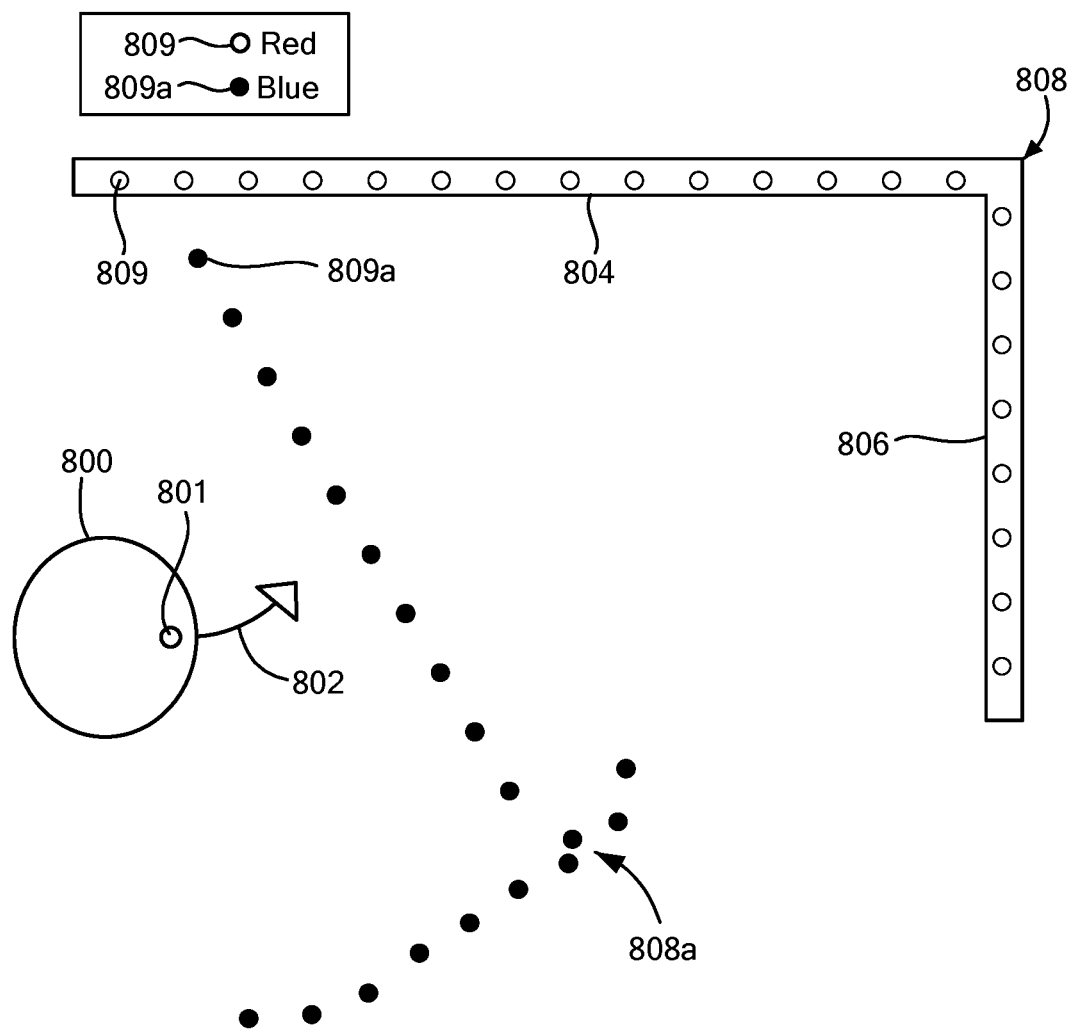
FIG. 16 depicts the image of a robot of FIG. 13 with the current laser scan points and the predicted laser scan points from the laser scanner of the robot at the predicted location.

In FIG. 16, the predicted laser scan 808a from FIG. 15 is superimposed on the image showing robot 800 in its original location (FIG. 13) relative to wall structures 804 and 806 and depicting the laser scan 808 from the original position. This depicts what the robot's laser scan will look like in N seconds, but relative to the current position of the robot. The current laser scan data and the predicted laser scan data can be used to determine if a collision with an obstacle is likely and from this information determine corrective action that can be taken to avoid the collision. However, this may be done at a much faster rate than could be by the robot's primary control system, as mentioned above.

In FIG. 15, the robot is shown to be at the predicted position, 800a. In other words, after N seconds the robot has traveled from its then current position in FIGS. 13 and 14 to its predicted position in FIG. 15. In this position, robot 800a is much closer to wall structure 804 and is continuing on a trajectory 802 toward wall structure 804. As described in further detail below with regard to FIGS. 19 and 20, when the predicted laser scan points are within the robot, a collision is predicted and corrective action must be taken to avoid a collision.

Figure 17:
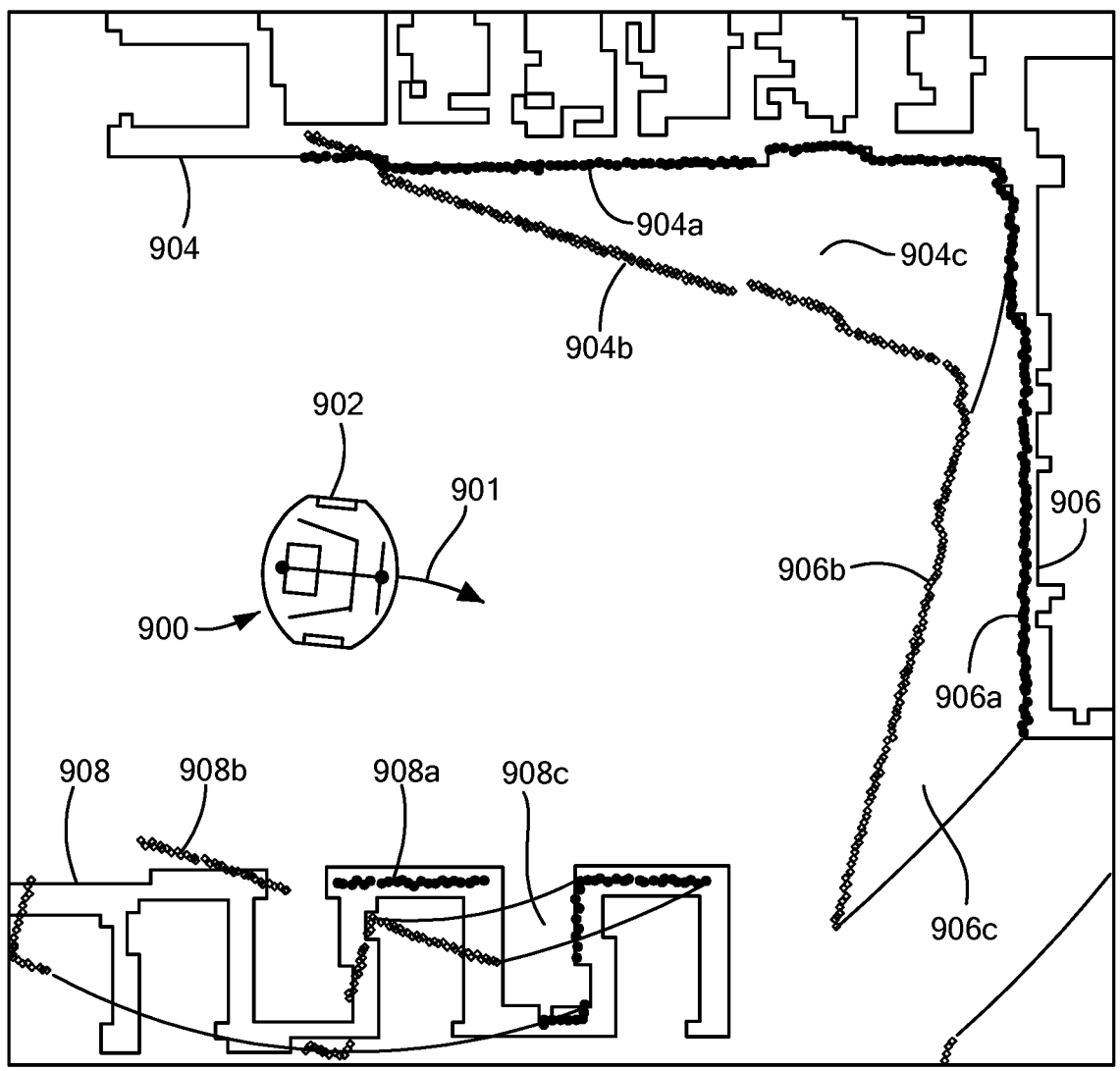
FIG. 17 depicts an image of a robot on a trajectory toward adjoining walls with the current laser scan points and the predicted laser scan points as well as arc segments connecting the respective current and predicted scan points according to an aspect of the invention.

Since this algorithm may be applied to any type of AMR of any shape, the algorithm represents the robot as a polygon. This generalizes well to all robot morphologies: for rectangular robots, representation of the robot's footprint by a polygon is obvious. For circular bases, the robot footprint may be approximated with an R-sided convex polygon, which can be seen in FIG. 17, where robot 900 is shown represented by polygon 902. In this example, robot 900 is shown surrounded by wall structures 904, 906, and 908 off of which are reflected the laser scans of robot 900 at its current location.

The current laser scans are 904a, 906a, and 908a, which are aligned with the wall structures 904, 906, and 908. The predicted position of robot 900 traveling along arc path 901 at the current velocity is determined (not shown) and a predicted laser scan from the predicted location is determined. The predicted laser scan at the predicted location is superimposed on the image relative to robot 900 in its original location. The predicted laser scans 904b, 906b, and 908b are depicted relative to current laser scans are 904a, 906a, and 908a.

The algorithm next draws an arc between each current laser scan point of laser scan 904a, 906a, 908a and its respective predicted laser scan point of predicted laser scans 904b, 906b, 908b to form a plurality of arcs 904c, 906c, 908c. The arcs are approximated by a series of L line segments, which can be more clearly seen in FIG. 18, where a polygon 1000 represents a robot and laser scan segment 1002, consisting of laser scan points 1002a-1002d represent the laser scan points reflecting off of an object from the current location of the robot. Predicted laser scan segment 1004, consisting of laser scan points 1004a-1004d represent the laser scan points reflecting off of an object from the predicted location of the robot represented by polygon 1000 in N seconds, which is determined, as described above, based on the trajectory and current velocity.

Figure 18:
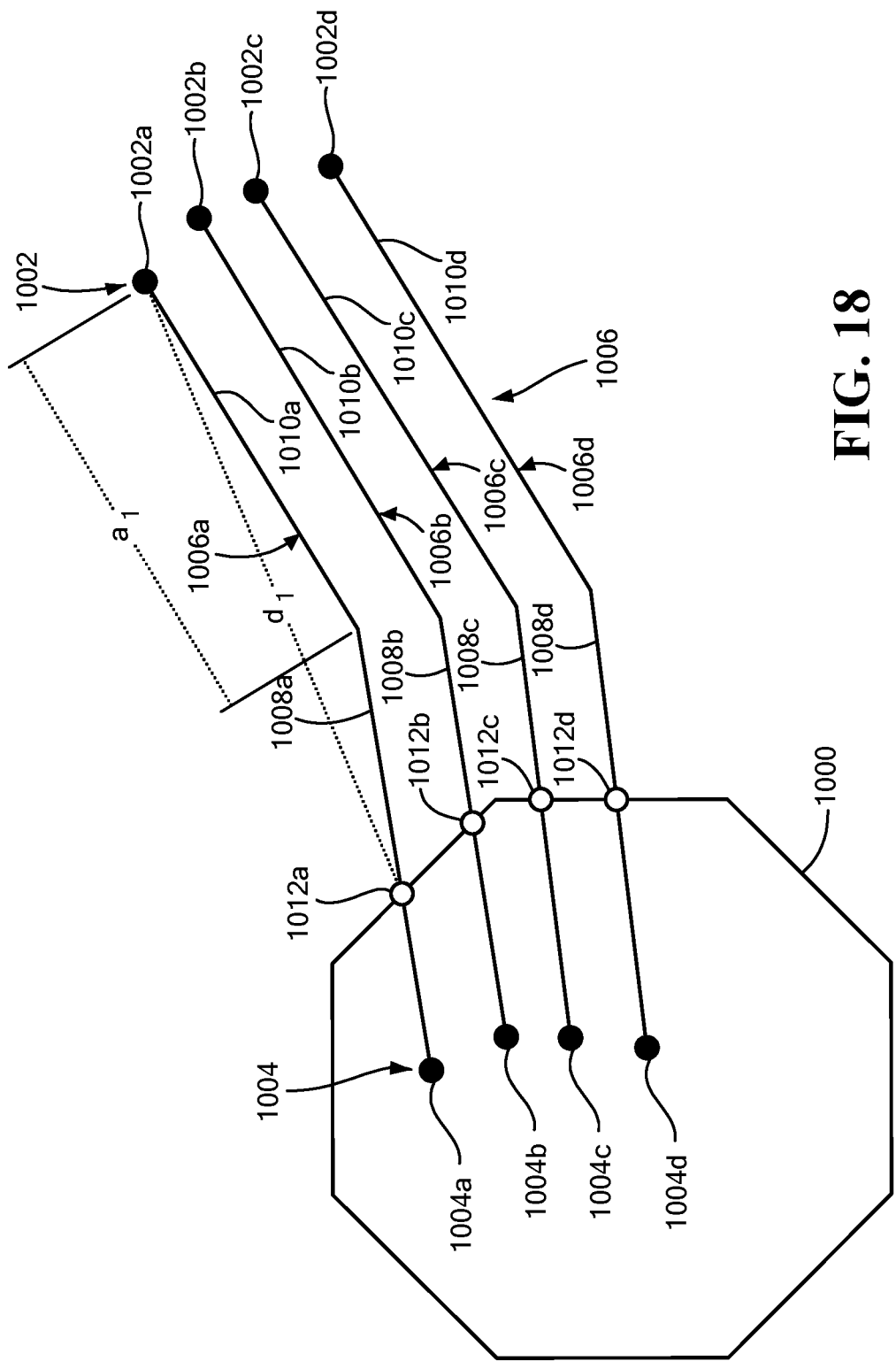
FIG. 18 is a schematic diagram of exemplary portion of current and predicted laser scans and arc segments connecting the respective current and predicted scan points wherein the arc segments penetrate the polygon representing the robot according to an aspect of the invention.

If, as is the case shown in FIG. 18, one or more of the plurality of arcs between the current laser scan and the predicted laser scan penetrate(s) the polygon (e.g. 1000), representing the robot at its current location, this indicates that, at the current velocity and trajectory, the robot will collide with the obstacle producing the laser scan points being reflected within N seconds or less. With the information that a collision is predicted, the algorithm, according to an aspect of this invention, may adjust the commanded velocity of the mobile robot. It may do this on the basis of scaling factor or a speed factor based on the depth of incursion into the polygon for one or more intersecting arcs.

The scaling/speed factor is determined by performing an intersection test for each laser scan arc and the polygon that represents the robot. If an arc intersects the robot, a "depth" of incursion into the polygon is used to compute the scaling/speed factor. The depth of the incursion for a given arc may be the distance from the predicted scan point, when the scan point is located in the polygon, to the intersection point in the polygon, i.e. the entry point, as is shown in FIG. 18. Although not shown, it is possible that the predicted scan point for a given arc may be located outside of the polygon behind the robot and the arc will pass entirely through the polygon representing the robot. In that case the depth of incursion would be measured from the entry point, i.e. where the arc first intersects the polygon, to the exit point, i.e. where the arc exits the polygon. The depth of incursion determination may be simplified and normalized using arc approximations, as described below.

Continuing to refer to FIG. 18, the arcs are represented by arc approximations, such as approximation 1006, which consists of arc approximating line segments 1006a-1006d. The arc approximating line segments are depicted connecting current laser scan points 1002a-1002d to predicted laser scan points 1004a-1004d. Each arc approximating line segment is formed of equal length line segments. As shown, arc approximating line segment 1006a, comprises two equal length line segments 1008a and 1010a. Each of the other arc approximating line segments 1006b-1006d are similarly formed of equal length segments 1008 and 1010. As depicted, the line segments 1008a-1008d of each arc approximating line segment 1006a-1006d intersect polygon 1000 at intersecting points 1012a-1012d, respectively.

In order to calculate the scaling/speed factor two quantities may be defined: d is the straight-line distance from each current laser scan point to the point of intersection of polygon 1000, and a is the length of a single segment in the arc approximation. Straight-line distance d and arc length segment length a for each laser scan point pair (1002 and 1004) are determined: $d_1$ to $d_4$ and $a_1$ to $a_4$.

The length of one entire arc approximation is given by the following equation:

$$A = aL$$

Where L is the number of equal length line segments in an arc approximation. Note that the value of A will be different for each arc approximation. The final scaling/speed factor, f, calculation is given by determining the minimum ratio of d/A across the set, S, of all arc approximations as follows:

$$f = \min_{i \in S}(d_i / A_i)$$

The final scaling/speed factor f may be limited to be in the range [0, 1] and used to scale the final velocity command, $V_c$, of the robot, i.e. $f*V_c$. A scaling/speed actor of 0 causes the velocity commanded to also be 0, while a scaling/speed factor of 1 maintains the full velocity commanded. The scaling factor maintains the commanded motion arc, that is, the ratio of linear and angular commanded velocity is maintained but scaled based on f. With a smaller value for d, indicating that the robot is in close proximity to the object, and a larger value for A, indicating that the predicted laser scan points will be located deeper within or even beyond the polygon (i.e. a depth of incursion), a small scaling/speed factor will result. The smaller the scaling/speed factor, the lower the scaled commanded velocity.

It should be noted that in order to achieve a scaling/speed factor of 0, which would cause the robot to stop before colliding with an object, a safety buffer, i.e. a minimum distance to an object, is defined and the safety buffer value is subtracted from the determined minimum valued. When the minimum value d is equal to or less than the safety buffer value, f will be equal to zero and when applied to the final velocity commanded, it will result in a zero velocity causing the robot to stop.

Note that the straight-line distanced is always less than or equal to the along-the-segment distance to the intersection point. This means that f will always produce a speed factor that is less than the speed factor would be if d were computed along the line segments a. As this algorithm is designed for safety, this is a preferred result. However, for efficiency, f, may be determined by computing d as the total length along the line segments a, but there will be less margin for error. Or, the minimum value for d may be determined from the set of arcs and then the minimum value for d may be normalized by the arc length approximation A to get the final speed factor f.

Figure 19:
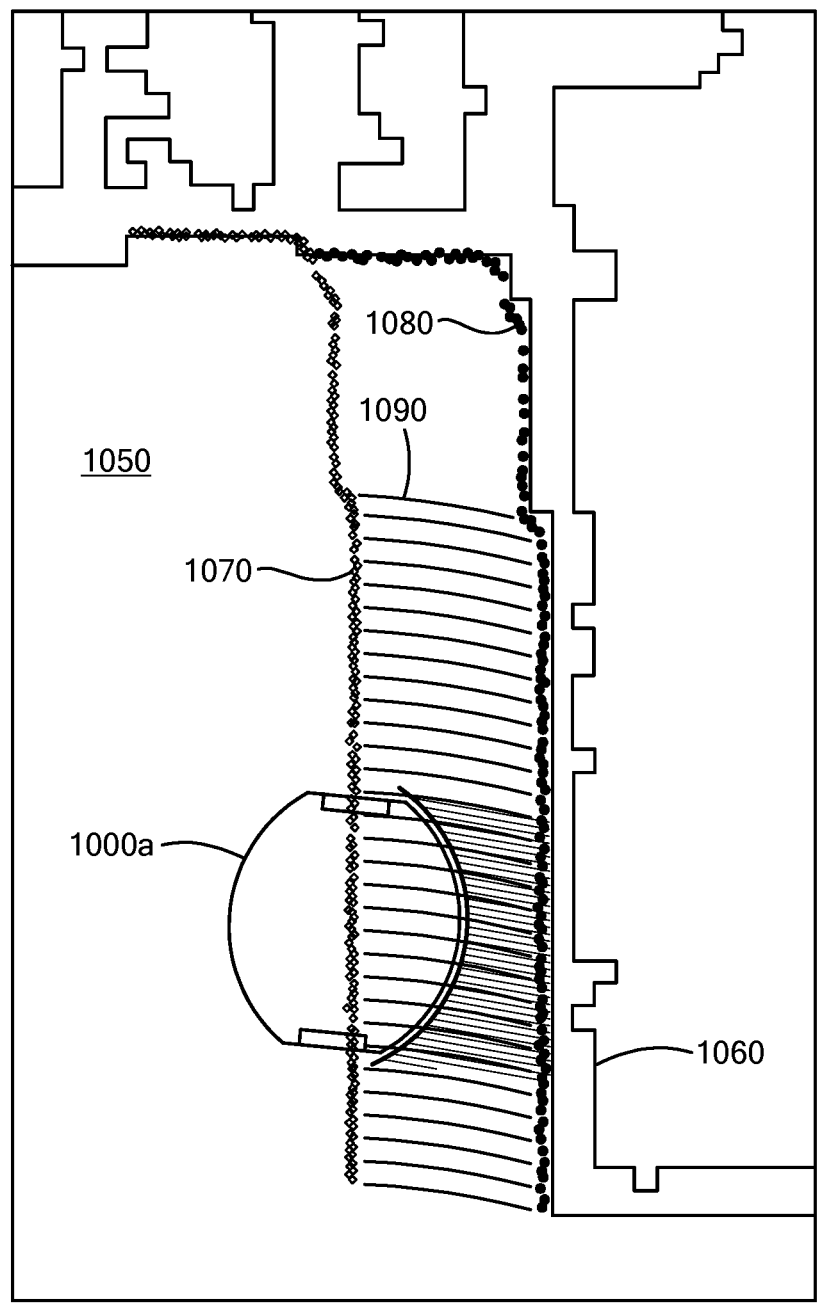
FIG. 19 depicts an image of a robot on a trajectory to impact a wall with the current laser scan points and the predicted laser scan points as well as arc segments connecting the respective current and predicted scan points wherein the arc segments penetrate the polygon representing the robot according to an aspect of the invention.

A visualization of a robot represented by polygon 1000a in an environment 1050 is shown in FIG. 19. In it, the robot/polygon 1000 is shown in close proximity to wall structure 1060 and on a course to collide with it. The robot is being commanded by its primary control system to drive forward and, due to the long cycle time, it could collide with the wall before the primary control system could take corrective action. However, with the algorithm described herein, the current laser scan 1070, the predicted scan 1080, and the arc segments 1090 connecting the current laser scan and predicted laser scan, depict that the predicted laser scan 1070 is intersecting the polygon 1000a representing the robot. This indicates that a collision is imminent and the algorithm would calculate a speed factor, f to scale final velocity command of the robot by f. In this case, f may be determined to be 0, which cause the robot to stop short of the wall, thus preventing a collision.

Non-Limiting Example Computing Devices

Figure 20:
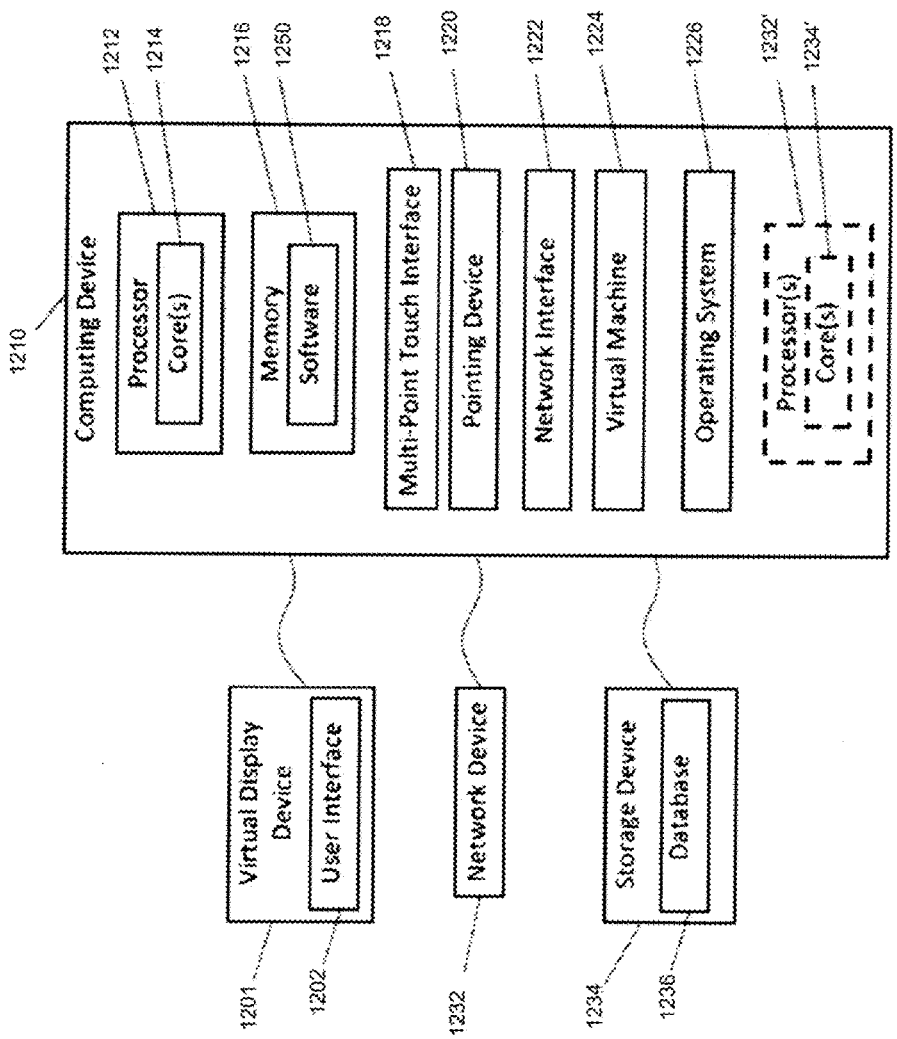
FIG. 20 is a block diagram of an exemplary computing system.

The above described robot and overall robot system are implemented using one or more computing devices. FIG. 20 is a block diagram of an exemplary computing device 1210 such as can be used, or portions thereof, in accordance with various embodiments as described above with reference to FIGS. 1-19. The computing device 1210 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1216 included in the computing device 1210 can store computer-readable and computer-executable instructions or software for performing the operations disclosed herein. For example, the memory can store software application 1240 which is programmed to perform various of the disclosed operations as discussed with respect to FIGS. 1-19. The computing device 1210 can also include configurable and/or programmable processor 1212 and associated core 1214, and optionally, one or more additional configurable and/or programmable processing devices, e.g., processor(s) 1212' and associated core (s) 1214' (for example, in the case of computational devices having multiple processors/cores), for executing computer-readable and computer-executable instructions or software stored in the memory 1216 and other programs for controlling system hardware. Processor 1212 and processor(s) 1212' can each be a single core processor or multiple core (1214 and 1214') processor.

Virtualization can be employed in the computing device 1210 so that infrastructure and resources in the computing device can be shared dynamically. A virtual machine 1224 can be provided to handle a process running on multiple processors so that the process appears to be using only one computing resource rather than multiple computing resources. Multiple virtual machines can also be used with one processor.

Memory 1216 can include a computational device memory or random access memory, such as but not limited to DRAM, SRAM, EDO RAM, and the like. Memory 1216 can include other types of memory as well, or combinations thereof.

A user can interact with the computing device 1210 through a visual display device 1201, 111A-D, such as a computer monitor, which can display one or more user interfaces 1202 that can be provided in accordance with exemplary embodiments. The computing device 1210 can include other I/O devices for receiving input from a user, for example, a keyboard or any suitable multi-point touch interface 1218, a pointing device 1220 (e.g., a mouse). The keyboard 1218 and the pointing device 1220 can be coupled to the visual display device 1201. The computing device 1210 can include other suitable conventional I/O peripherals.

The computing device 1210 can also include one or more storage devices 1234, such as but not limited to a hard-drive, CD-ROM, or other computer readable media, for storing data and computer-readable instructions and/or software that perform operations disclosed herein. Exemplary storage device 1234 can also store one or more databases for storing any suitable information required to implement exemplary embodiments. The databases can be updated manually or automatically at any suitable time to add, delete, and/or update one or more items in the databases.

The computing device 1210 can include a network interface 1222 configured to interface via one or more network devices 1232 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1222 can include a built-in network adapter, network interface card, PCMCIA network card, card bus network adapter, wireless network adapter, USB network adapter, modem or any other device suitable for interfacing the computing device 1210 to any type of network capable of communication and performing the operations described herein. Moreover, the computing device 1210 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1210 can run any operating system 1226, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1226 can be run in native mode or emulated mode. In an exemplary embodiment, the operating system 1226 can be run on one or more cloud machine instances.

Figure 21:
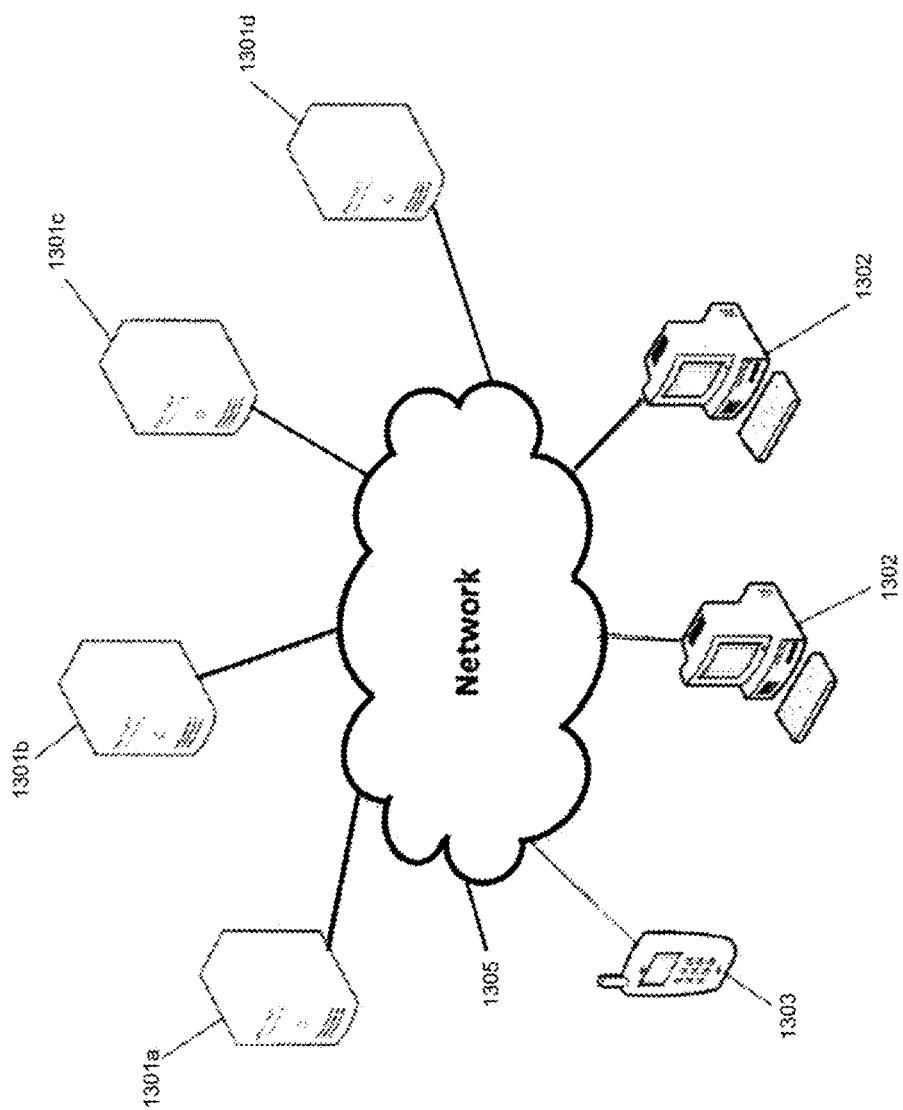
FIG. 21 is a network diagram of an exemplary distributed network.

FIG. 21 is an example computational device block diagram of certain distributed embodiments. Although FIGS. 1-19, and portions of the exemplary discussion above, make reference to a warehouse management system 15, order-server 14, or robot tracking server 902 each operating on an individual or common computing device, one will recognize that any one of the warehouse management system 15, the order-server 14, or the robot tracking server 902 may instead be distributed across a network 1305 in separate server systems 1301*a-d* and possibly in user systems, such as kiosk, desktop computer device 1302, or mobile computer device 1303. For example, the order-server 14 may be distributed amongst the tablets 48 of the robots 18. In some distributed systems, modules of any one or more of the warehouse management system software and/or the order-server software can be separately located on server systems 1301*a-d* and can be in communication with one another across the network 1305.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

What is claimed is:

1. A method for predicting a collision between a mobile robot and an obstacle in an environment comprising:
generating a control trajectory for the mobile robot for each of a plurality of control cycles; and
predicting, between each of the plurality of control cycles, a collision of the mobile robot and an obstacle, wherein the step of predicting includes:
obtaining laser scan data for the mobile robot at a current location in the environment; wherein the laser scan data includes raw data output from a laser scanner and wherein the raw data output from the laser scanner includes laser scan points indicating points of reflection off of obstacles in the environment;
representing the mobile robot at the current location as a polygon;
predicting a future location of the mobile robot in the environment;
producing predicted laser scan data corresponding to the future location of the mobile robot in the environment, wherein the predicted laser scan data includes predicted laser scan points indicating predicted points of reflection off of obstacles in the environment from the future location of the mobile robot; and
assessing the predicted laser scan data relative to the mobile robot at the current location to determine whether a collision with an obstacle is predicted; wherein assessing the predicted laser scan data includes connecting each of the laser scan points with a corresponding predicted laser scan point with an arc, thereby forming a plurality of arcs, and determining if any of the plurality of arcs penetrate the polygon representing the mobile robot at the current location.

2. The method of claim 1 wherein the step of predicting the future location of the mobile robot in the environment includes estimating the future location of the mobile robot moving along an arc path after N seconds of travel from the current location using a commanded velocity of the mobile robot.

3. The method of claim 2 wherein N is a number between 1 and 2.

4. The method of claim 1 the polygon representing the mobile robot is an R-sided, convex polygon.

5. The method of claim 1 wherein each arc of the plurality of arcs comprises a plurality of line segments, L.

6. The method of claim 1 wherein the step of assessing the predicted laser scan data relative to the mobile robot at the current location includes determining if any of the plurality of arcs intersect with a point on the polygon representing the mobile robot, which is indicative of a potential collision between the mobile robot and an obstacle.

7. The method of claim 6 further including adjusting the commanded velocity of the mobile robot using a scaling factor based at least in part on a depth of incursion into the polygon for at least one intersecting arc.

8. The method of claim 7 wherein the depth of incursion into the polygon for each intersecting arc is determined based on the length of an arc length approximation for the intersecting arc.

9. The method of claim 8 wherein for each intersecting arc, a ratio of a straight line distance from the current laser scan point on the obstacle to the point of intersection on the polygon relative to the arc length approximation is determined and the minimum ratio is used as the scaling factor.

10. An autonomous mobile robot configured to predict a collision with an obstacle in an environment, comprising:
a mobile robot base;
a laser scanner mounted on the mobile robot base; and
a computer on the mobile robot base, including a processor and a memory, the computer being operatively coupled to the laser scanner; the processor configured to execute instructions stored in memory to:
generate a control trajectory for the mobile robot for each of a plurality of control cycles; and
predict, between each of the plurality of control cycles, a collision of the mobile robot and an obstacle, the step of predicting including:
obtaining laser scan data for the mobile robot at a current location in the environment; wherein the laser scan data includes raw data output from a laser scanner and wherein the raw data output from the laser scanner includes laser scan points indicating points of reflection off of obstacles in the environment;

representing the mobile robot at the current location as a polygon;

predicting a future location of the mobile robot in the environment;

producing predicted laser scan data corresponding to the future location of the mobile robot in the environment, wherein the predicted laser scan data includes predicted laser scan points indicating predicted points of reflection off of obstacles in the environment from the future location of the mobile robot; and assessing the predicted laser scan data relative to the mobile robot at the current location to determine whether a collision with the obstacle is predicted; wherein assessing the predicted laser scan data includes connecting each of the laser scan points with a corresponding predicted laser scan point with an arc, thereby forming a plurality of arcs, and determining if any of the plurality of arcs penetrate the polygon representing the mobile robot at the current location.

11. The autonomous mobile robot of claim 10 wherein the instruction stored in memory to predict the future location of the mobile robot in the environment incudes estimating the future location of the mobile robot moving along an arc path after N seconds of travel from the current location using a commanded velocity of the mobile robot.

12. The autonomous mobile robot of claim 11 wherein N is a number between 1 and 2.

13. The autonomous mobile robot of claim 10 the polygon representing the mobile robot is an R-sided, convex polygon.

14. The autonomous mobile robot of claim 10 wherein each arc of the plurality of arcs comprises a plurality of line segments, L.

15. The autonomous mobile robot of claim 10 wherein when the processor executes instructions stored in memory to assess the predicted laser scan data relative to the mobile robot at the current location, the processor is further configured to determine if any of the plurality of arcs intersect with a point on the polygon representing the mobile robot, which is indicative of a potential collision between the mobile robot and an obstacle.

16. The autonomous mobile robot of claim 15 wherein the processor is further configured to execute instructions stored in memory to adjust a commanded velocity of the mobile robot using a scaling factor based at least in part on a depth of incursion into the polygon for at least one intersecting arc.

17. The autonomous mobile robot of claim 16 wherein the depth of incursion into the polygon for each intersecting arc is determined based on the length of an arc length approximation for the intersecting arc.

18. The method of claim 17 wherein the processor is further configured to execute instructions stored in memory to calculate a ratio for each intersecting arc, wherein the ratio is of a straight line distance from the current laser scan point on the obstacle to the point of intersection on the polygon relative to the arc length approximation and the minimum ratio is used as the scaling factor.

* * * * *